US012053980B2

(12) United States Patent
Lee et al.

(10) Patent No.: US 12,053,980 B2
(45) Date of Patent: Aug. 6, 2024

(54) PRINTER MEDIA LOW SENSING USING MOTOR CURRENT DRAWN WHEN FEEDING

(71) Applicant: Honeywell International Inc., Charlotte, NC (US)

(72) Inventors: Phek Thong Lee, Singapore (SG); Cheng Khoon Ng, Singapore (SG); Sze Ping Ching, Singapore (SG)

(73) Assignee: Honeywell International Inc., Charlotte, NC (US)

( * ) Notice: Subject to any disclaimer, the term of this patent is extended or adjusted under 35 U.S.C. 154(b) by 182 days.

(21) Appl. No.: 17/818,849

(22) Filed: Aug. 10, 2022

(65) Prior Publication Data

US 2024/0051289 A1 Feb. 15, 2024

(51) Int. Cl.

*B41J 2/045* (2006.01)
*B41J 11/00* (2006.01)
*B41J 11/04* (2006.01)

(52) U.S. Cl.

CPC ......... *B41J 2/0452* (2013.01); *B41J 2/04555* (2013.01); *B41J 11/0075* (2013.01); *B41J 11/04* (2013.01)

(58) Field of Classification Search

CPC .. B41J 2/0452; B41J 2/04555; B41J 11/0075; B41J 11/04; B41J 2/355; B41J 13/00; B41J 13/0009; B41J 15/00; B41J 15/04; B41J 15/044; B41J 15/046

See application file for complete search history.

(56) References Cited

U.S. PATENT DOCUMENTS

| | | | |
|---|---|---|---|
| 6,789,869 B2 | 9/2004 | Takeishi | |
| 2020/0145546 A1 | 5/2020 | Alaganchetty et al. | |

FOREIGN PATENT DOCUMENTS

| | | | | |
|---|---|---|---|---|
| EP | 2744666 | * | 7/2018 | ............ B41J 25/312 |
| JP | 05-155081 A | | 6/1993 | |
| JP | 2016030691 | * | 3/2016 | ............... B65H 7/14 |
| JP | 2023124318 | * | 9/2023 | .......... B41J 2/04555 |

OTHER PUBLICATIONS

Extended European Search Report Mailed on Dec. 1, 2023 for EP Application No. 23184779, 8 page(s).

* cited by examiner

*Primary Examiner* — Kristal Feggins
(74) *Attorney, Agent, or Firm* — Alston & Bird LLP

(57) ABSTRACT

Printer circuits and components for detecting a media low condition on a printer are provided. The printer circuit comprises a motor coupled to a platen roller, a current sense resistor coupled in series with the motor, a current measuring circuit comprising an operational amplifier circuit configured to receive input voltage and output voltage of the current sense resistor, generate a differential voltage based at least in part on the input voltage and the output voltage, and convert the differential voltage to a current, and an analog-to-digital converter and control mechanism configured to receive the current from the current measuring circuit and control operation of the motor based at least in part on the current.

20 Claims, 4 Drawing Sheets

PRINTER MEDIA LOW SENSING USING MOTOR CURRENT DRAWN WHEN FEEDING

FIELD OF THE INVENTION

Example embodiments of the present disclosure relate generally to printers, and in particular, printers with improved media low detection.

BACKGROUND

Printers generally include components, such as a print head, a platen, a paper supply, and a control mechanism. The control mechanism may control a motion of the print head relative to the paper supply, select a character to be printed, and advance print media (e.g., paper) supply as necessary.

It is generally undesirable to operate a printer without paper. For example, thermal printers that are operated without paper may overheat, since the paper is also used to absorb heat generated by the printhead during printing operations. In addition, operating thermal printers without paper may cause excessive wear to the printhead, since the print head would be running directly on the platen instead of a print media. Media low detection may also serve as an indication to prepare or purchase replacement roll of print media before depletion.

Therefore, in order to avoid operating printers without paper, conventional printers have been provided with low paper sensing and warning systems. Low paper sensing systems provide notification that a paper supply is near completion. However, such systems may come at the cost of additional hardware and design footprint. Thus, there is a need for a media low detection feature for space-constraint desktop printers.

BRIEF SUMMARY

Various embodiments described herein relate to circuits, apparatuses, and methods for detecting a media low condition on a printer device.

In accordance with various embodiments of the present disclosure, a printer circuit is provided. In some embodiments, the printer circuit comprises a motor coupled to a platen roller, a current sense resistor coupled in series with the motor, a current measuring circuit comprising an operational amplifier circuit configured to receive input voltage and output voltage of the current sense resistor, generate a differential voltage based at least in part on the input voltage and the output voltage, and convert the differential voltage to a current, and an analog-to-digital converter and control mechanism configured to receive the current from the current measuring circuit and control operation of the motor based at least in part on the current.

In some embodiments, the current corresponds to an amount of current drawn by the motor. In some embodiments, the motor drives the platen roller to draw print media from a media supply. In some embodiments, the current is proportional to an amount of torque needed for the platen roller to draw the print media from the media supply to achieve a given print speed. In some embodiments, the current is directly proportional to an amount of print media left of a media supply. In some embodiments, the current measuring circuit is coupled in parallel with the current sense resistor.

According to another embodiment, a printer apparatus is provided. In some embodiments, the printer apparatus comprises a media supply including print media, a motor coupled to a platen roller configured to draw the print media from the media supply, a current measuring circuit, a memory device having executable instructions stored therein, and a processor, in response to the executable instructions, configured to receive a signal from the current measuring circuit, determine a current draw by the motor based on the signal, determine the current draw is less than a given threshold, and generate a media low message.

In some embodiments, the signal comprises a differential voltage between input and output voltages from a current sense resistor. In some embodiments, the current draw is dependent on an amount of current needed by the motor to draw the print media from the media supply and operate at a predetermined operating speed. In some embodiments, the given threshold comprises a current value indicative of low media supply. In some embodiments, the current value corresponds to a current draw of the motor operating under low torque during low media supply. In some embodiments, the printer apparatus further comprises a display screen configured to display the media low message. In some embodiments, the processor is further configured to transmit the media low message to a controller for toggling at least one of an indicator light and a speaker.

According to another embodiment, a method for detecting a media low condition on a printer device is provided. The printer device comprises a media supply including print media, a motor coupled to a platen roller configured to draw the print media from the media supply, and a current measuring circuit. In some embodiments, the method comprises receiving, by a processor, a signal from the current measuring circuit, determining, by the processor, a current draw by the motor based on the signal, determining, by the processor, the current draw is less than a given threshold, and generating, by the processor, a media low message.

In some embodiments, the signal comprises a differential voltage between input and output voltages from a current sense resistor. In some embodiments, the current draw is dependent on an amount of current needed by the motor to draw the print media from the media supply and operate at a predetermined operating speed. In some embodiments, the given threshold comprises a current value indicative of low media supply. In some embodiments, the current value corresponds to a current draw of the motor operating under low torque during low media supply. In some embodiments, the printer device further comprises a display screen configured to display the media low message. In some embodiments, the processor is further configured to transmit the media low message to a controller for toggling at least one of an indicator light and a speaker.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise.

Embodiments incorporating teachings of the present disclosure are shown and described with respect to the figures presented herein, in which.

DETAILED DESCRIPTION OF THE INVENTION

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

Various example embodiments of the present disclosure overcome technical challenges and difficulties in providing low print media supply detection for printers using a low-footprint hardware design. In accordance with various examples of the present disclosure, components of example hardware for low print media supply are disclosed.

Figure 1:
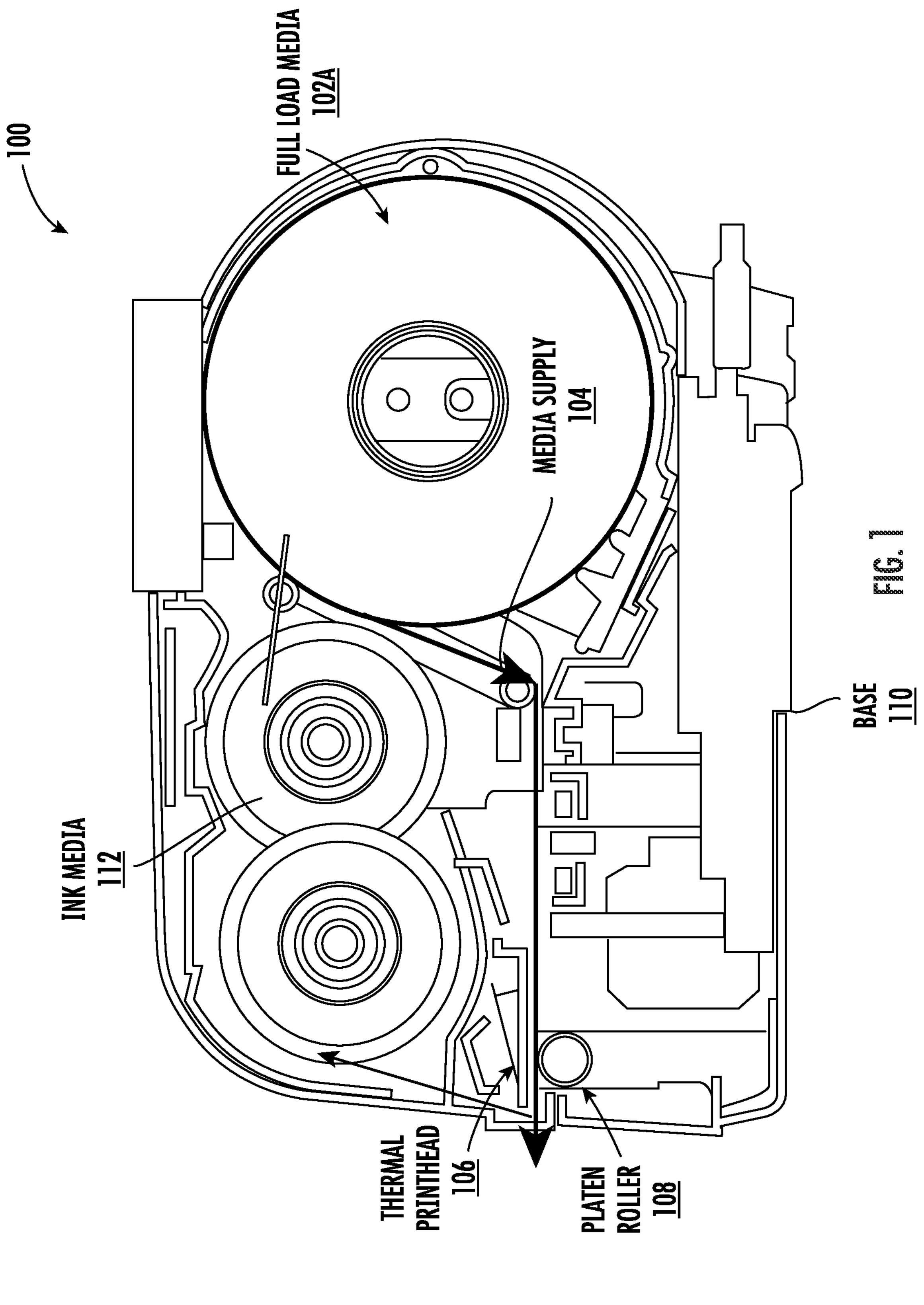
FIG. 1 illustrates a cross sectional view of an example printer with full media load.
Figure 2:
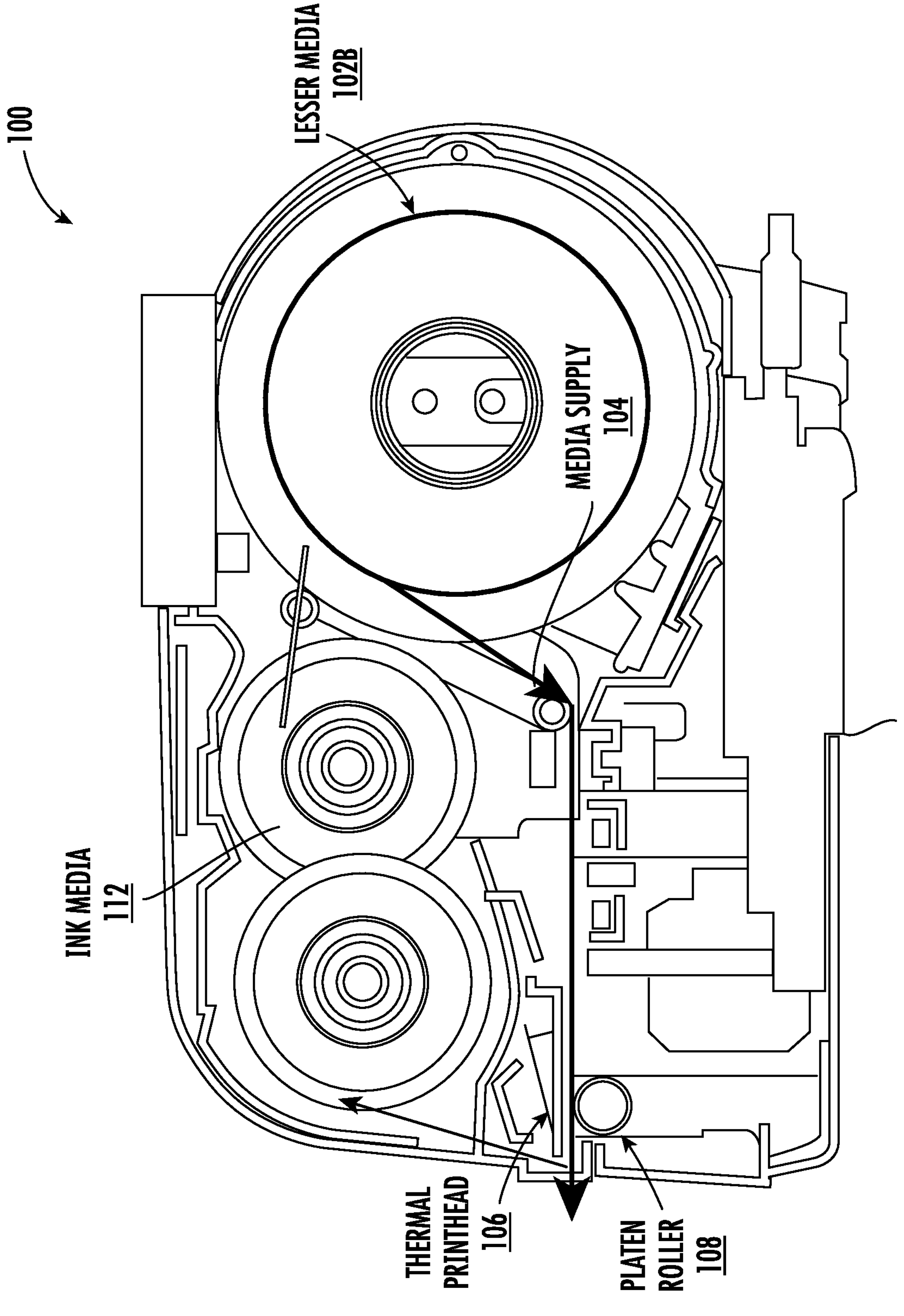
FIG. 2 illustrates a cross sectional view of an example printer with lesser media load.

FIG. 1 presents a printer 100 comprising a media supply 104, a thermal printhead 106, a platen roller 108, and a base 110. The media supply 104 may comprise print media, such as a paper roll including a core and a length of paper sheet around the core. During operation of the printer 100, a full load media 102A of media supply 104 may decrease as the paper supply roll rotates and is fed through between thermal printhead 106 and platen roller 108 such that the media supply 104 decreases to the lesser media 102B, as shown in FIG. 2. The printer 100 may be configured so that base 110 of the printer 100 rests on a mounting surface. In some embodiments, the mounting surface may be, for example, a table or desk such that the printer 100 is generally orientated horizontally.

Ink media 112 and print media from media supply 104 may be fed together between thermal printhead 106 and platen roller 108. Thermal printhead 106 may comprise a plurality of resistive elements capable of being selectively energized to record data in hard copy form. The resistive elements may receive energy from a power source in response to stored or programed digital information related to text, bar codes, pictorial, or graphical images. Heat from each energized element may be applied to ink media 112 to cause transfer of ink or dye to the print media from media supply 104 as the print media from media supply 104 passes through between the thermal printhead 106 and the platen roller 108.

Platen roller 108 may comprise a rigid shaft, usually of metal, and an elastomer layer wrapped around the shaft. The platen roller 108 may be driven by a motor that draws print media from media supply 104 out as the thermal printhead 106 prints on the print media from media supply 104. When media supply 104 comprises a full load media 102A, more drive current may be required by the motor to draw the print media from media supply 104 outwards in comparison to current required when the media supply 104 comprises less media 102.

According to various embodiments of the present disclosure, a current sensing circuit may be configured within a printer, such as printer 100, to determine the drive current of the motor that drives the platen roller 108. Based on the value of the drive current, an amount of print media left can be determined.

Figure 3:
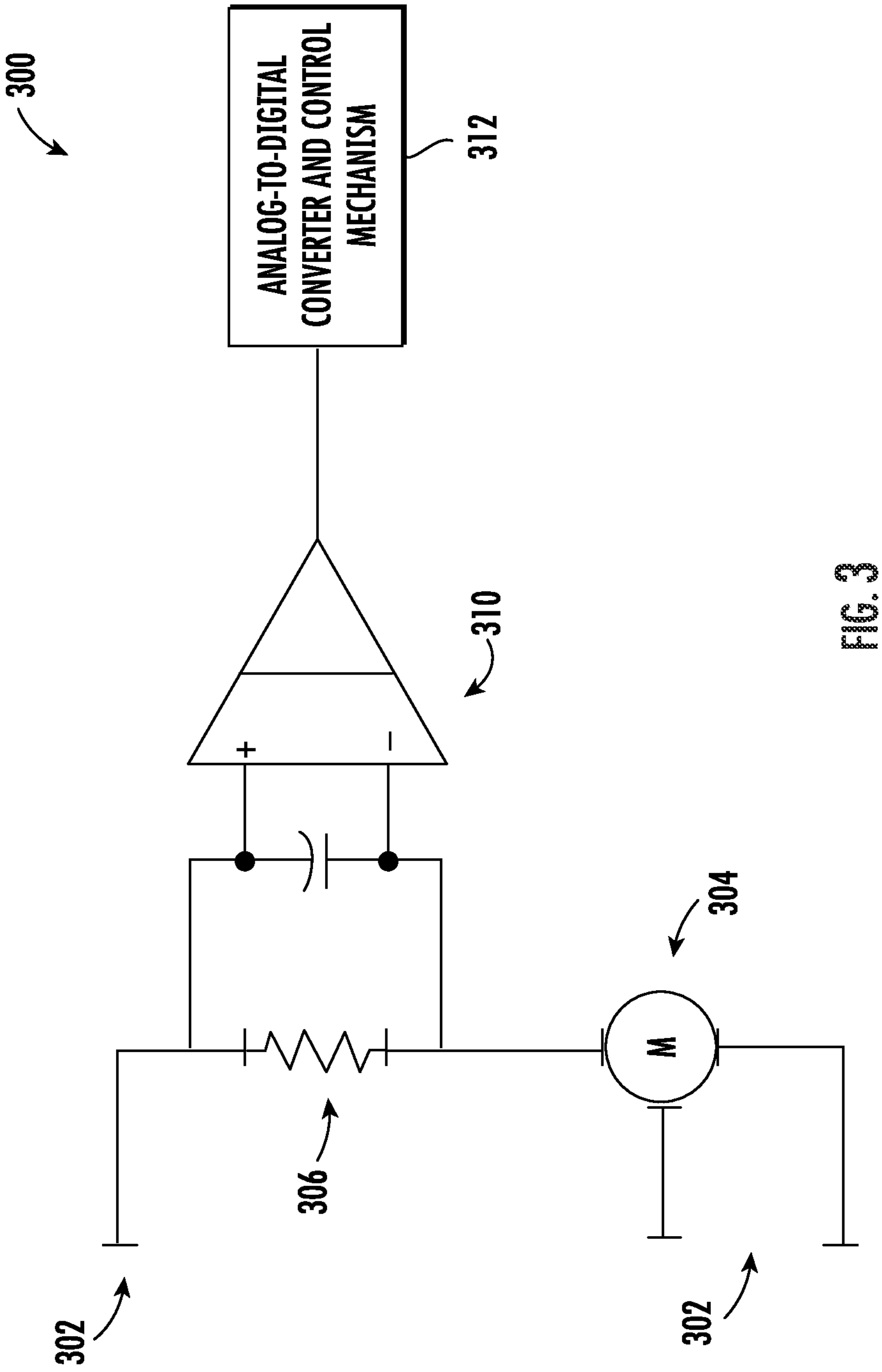
FIG. 3 illustrates a circuit schematic in accordance with various embodiments of the present disclosure.

FIG. 3 presents an exemplary printer circuit according to some embodiments of the present disclosure. Printer circuit 300 comprises a bridge circuit 302, current measuring circuit 310, and analog-to-digital converter and control mechanism 312. The bridge circuit 302 includes a motor 304 and a current sense resistor 306. Bridge circuit 302 may allow for measurement of an unknown current value corresponding to current drawn by motor 304. Motor 304 may be coupled to, for example, platen roller 108. The amount of current drawn by motor 304 may be proportional to an amount of torque needed for platen roller 108 to draw print media from media supply 104 needed to achieve a given print speed. As discussed above, when media supply 104 comprises a full load media 102A, more drive current may be required by the motor to draw the print media from media supply 104 outwards in comparison to current required when the media supply 104 comprises less media 102. As such, current drawn by motor 304 is directly proportional to an amount of print media left of media supply 104. In some embodiments, the motor may be configured to operate the printer at different printing speeds, such as 2 ips (inch-per second) to 12 ips, etc., and for each speed setting, a torque and current required to operate the motor to maintain the speed may vary.

Current sense resistor 306 is configured and coupled in series with motor 304. According to Kirchhoff s current law, the current across current sense resistor 306 is equal to the current drawn by motor 304. As such, measuring current of current sense resistor 306 may provide a current drawn by motor 304. Current measuring circuit 310 is coupled in parallel with current sense resistor 306 and receives as inputs, input voltage and output voltage of the current sense resistor 306. According to various embodiments of the present disclosure, the current measuring circuit 310 may comprise an operational amplifier circuit. The current measuring circuit 310 may generate differential voltage from the input and output voltages.

Current sense resistor 306 may comprise a resistor having a known resistance value. According to various embodiments of the present disclosure, current sense resistor 306 may include a minimal resistance value to reduce load and current draw that may otherwise adversely affect current flow to motor 304 and affect performance of motor 304. A minimal value of current sense resistor 306 may produce a proportionally minimal voltage value. To compensate, the current measuring circuit 310 may amplify (e.g., via operational amplifier) the small voltages for upstream conversion by an analog-to-digital converter (312). Current measuring circuit 310 may amplify the input and output voltages of the current sense resistor 306 to usable levels by analog-to-digital converter and control mechanism 312. In some embodiments, the current measuring circuit 310 may comprise an opto-isolated amplifier to provide electrical isolation.

In some embodiments, the current measuring circuit 310 may comprise a differential voltage to current converter. Accordingly, the analog-to-digital converter and control mechanism 312 may receive analog signals from the current measuring circuit 310 and convert the analog signals into digital signals representative of current drawn by motor 304 during operation.

In some embodiments, receiving signals from the current measuring circuit 310 by analog-to-digital converter and control mechanism 312 may comprise reading of the signals by printer firmware executed by a programmable processor during run time. The printer firmware may monitor current drawn by a motor associated with platen roller 108 and generate a media low warning or message upon the current being below a predetermined threshold. The programmable processor may be implemented as, for example, various devices comprising one or a plurality of microprocessors with accompanying digital signal processors; one or a plurality of processors without accompanying digital signal processors; one or a plurality of coprocessors; one or a plurality of multi-core processors; one or a plurality of controllers; processing circuits; one or a plurality of computers; and various other processing elements (including integrated circuits, such as ASICs or FPGAs, or a certain combination thereof). In some embodiments, the programmable processor may comprise one or more processors.

Figure 4:
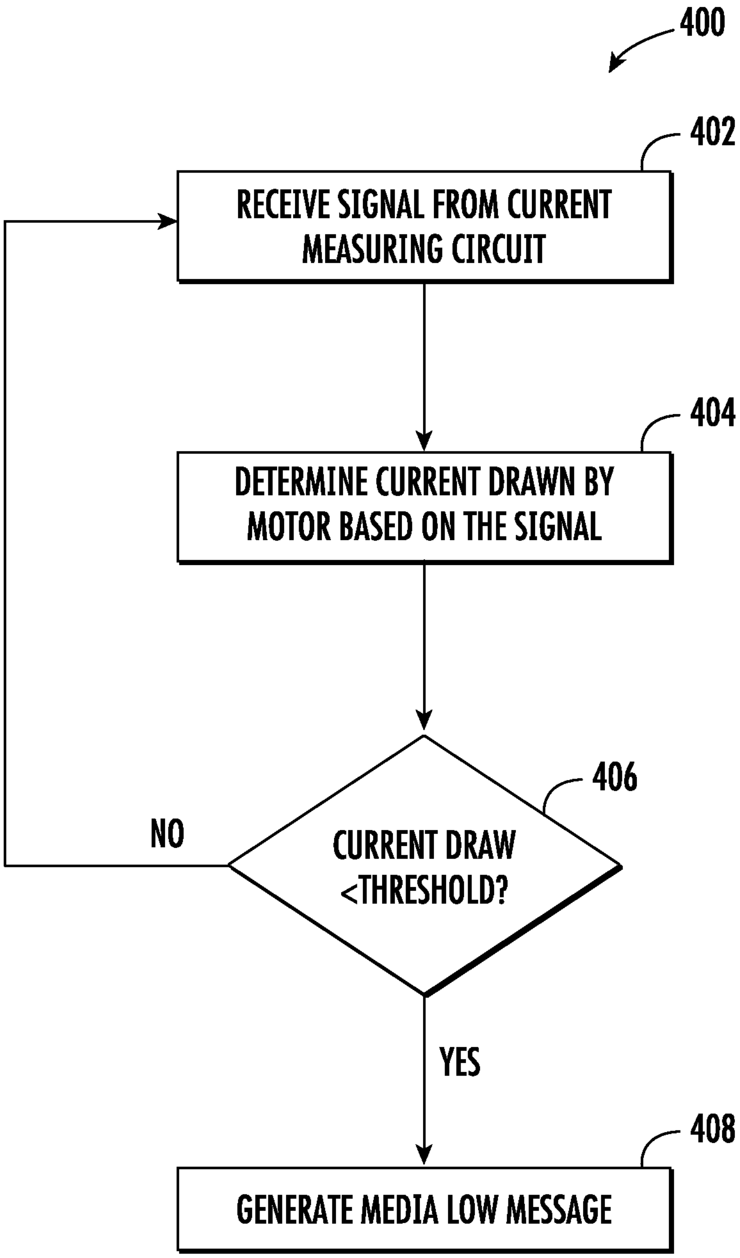
FIG. 4 illustrates an example flow diagram illustrating an example method for detecting a media low state of a printer in accordance with various embodiments of the present disclosure.

Referring now to FIG. 4, an example flow diagram illustrating an example method for detecting a media low state of a printer in accordance with some example embodiments of the present disclosure is provided. It is noted that each block of the flowchart, and combinations of blocks in the flowchart, may be implemented by various means such as hardware, firmware, circuitry and/or other devices associated with execution of software including one or more computer program instructions. For example, one or more of the steps/operations described in FIG. 4 may be embodied by computer program instructions, which may be stored by a non-transitory memory of an apparatus employing an embodiment of the present disclosure and executed by a processor component in an apparatus (such as, but not limited to, a monitoring system, a client computing device, a remote computing server, and/or the like). For example, these computer program instructions may direct the processor component to function in a particular manner, such that the instructions stored in the computer-readable storage memory produce an article of manufacture, the execution of which implements the function specified in the flowchart block(s).

As described above and as will be appreciated based on this disclosure, embodiments of the present disclosure may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

Referring now to FIG. 4, an example method 400 of detecting a media low state of a printer in accordance with some example embodiments described herein is illustrated. At step 402, a programmable processor receives a signal from a current measuring circuit within a circuit of a printer. The motor may comprise a motor for drawing print media from a media supply by a platen roller. The signal may be converted from a differential voltage between input and output voltages of a current sense resistor in the circuit of the printer, as discussed above. The current sense resistor may comprise a resistor used for measuring current drawn by the motor within the circuit of the printer.

In some embodiments, subsequent to step 402, the example method proceeds to step 404, where the programmable processor determines a current draw by the motor based on the signal. The current drawn by the motor may vary throughout operation of the printer. As an example, as a media supply of a printer decreases, the amount of current needed by a motor to draw print media from the media supply (e.g., torque) and operate at a predetermined operating speed may decrease. Whereas, replenishing the media supply may cause the motor to require a greater amount of current to draw print media from the media supply and operate at a predetermined operating speed.

In some embodiments, subsequent to step 404, the example method proceeds to step 406, where the programmable processor determines whether the current draw is less than a given threshold. The given threshold may comprise a current value indicative of low media supply. For example, the current value may correspond to a current draw of a motor operating under low torque when media supply is low. In some embodiments, the motor may be configured to operate the printer at different printing speeds, such as 2 ips (inch-per second) to 12 ips, etc., and for each speed setting, a torque required to maintain the speed may be different. As such, the given threshold may be determined based at least in part on a required current draw for operation the printer at a given printing speed. If the current draw is not less than the given threshold, the example method proceeds to step 402 to receive another signal.

In some embodiments, subsequent to step 406, if the current draw is less than the given threshold, the example method proceeds to step 408, where the programmable processor generates a media low message. The media low message may be, for example, displayed on a display screen of a printer. In some embodiments, the media low message may be transmitted by the programmable processor to a controller for toggling an indicator light, such as a light, and/or a speaker for sounding an alert on a printer.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

What is claimed is:

1. A printer circuit comprising:

a motor coupled to a platen roller;

a current sense resistor coupled in series with the motor;

a current measuring circuit comprising an operational amplifier circuit configured to receive input voltage and output voltage of the current sense resistor, generate a differential voltage based at least in part on the input voltage and the output voltage, and convert the differential voltage to a current; and an analog-to-digital converter and control mechanism configured to receive the current from the current measuring circuit and control operation of the motor based at least in part on the current.

2. The printer circuit of claim 1 wherein the current corresponds to an amount of current drawn by the motor.

3. The printer circuit of claim 1 wherein the motor drives the platen roller to draw print media from a media supply.

4. The printer circuit of claim 3 wherein the current is proportional to an amount of torque needed for the platen roller to draw the print media from the media supply to achieve a given print speed.

5. The printer circuit of claim 1 wherein the current is directly proportional to an amount of print media left of a media supply.

6. The printer circuit of claim 1 wherein the current measuring circuit is coupled in parallel with the current sense resistor.

7. A printer apparatus comprising:

a media supply including print media;

a motor coupled to a platen roller configured to draw the print media from the media supply;

a current measuring circuit;

a memory device having executable instructions stored therein; and a processor, in response to the executable instructions, configured to:

receive a signal from the current measuring circuit;

determine a current draw by the motor based on the signal;

determine the current draw is less than a given threshold; and generate a media low message.

8. The printer apparatus of claim 7 wherein the signal comprises a differential voltage between input and output voltages from a current sense resistor.

9. The printer apparatus of claim 7 wherein the current draw is dependent on an amount of current needed by the motor to draw the print media from the media supply and operate at a predetermined operating speed.

10. The printer apparatus of claim 7 wherein the given threshold comprises a current value indicative of low media supply.

11. The printer apparatus of claim 7 wherein the current value corresponds to a current draw of the motor operating under low torque during low media supply.

12. The printer apparatus of claim 7 further comprising a display screen configured to display the media low message.

13. The printer apparatus of claim 7 wherein the processor is further configured to transmit the media low message to a controller for toggling at least one of an indicator light and a speaker.

14. A method for detecting a media low condition on a printer device, the printer device comprising a media supply including print media, a motor coupled to a platen roller configured to draw the print media from the media supply, and a current measuring circuit, the method comprising:

receiving, by a processor, a signal from the current measuring circuit;

determining, by the processor, a current draw by the motor based on the signal;

determining, by the processor, the current draw is less than a given threshold; and generating, by the processor, a media low message.

15. The method of claim 14 wherein the signal comprises a differential voltage between input and output voltages from a current sense resistor.

16. The method of claim 14 wherein the current draw is dependent on an amount of current needed by the motor to draw the print media from the media supply and operate at a predetermined operating speed.

17. The method of claim 14 wherein the given threshold comprises a current value indicative of low media supply.

18. The method of claim 14 wherein the current value corresponds to a current draw of the motor operating under low torque during low media supply.

19. The method of claim 14 wherein the printer device further comprises a display screen configured to display the media low message.

20. The method of claim 14 wherein the processor is further configured to transmit the media low message to a controller for toggling at least one of an indicator light and a speaker.

* * * * *